(12) United States Patent  
Mintz et al.

(10) Patent No.: US 10,148,904 B1  
(45) Date of Patent: Dec. 4, 2018

(54) MULTI-TRACK PUPPETRY

(71) Applicant: Swaybox Studios, Inc., Shreveport, LA (US)

(72) Inventors: Arthur Mintz, Shreveport, LA (US); Theresa Andersson Mintz, Shreveport, LA (US); Noah Scruggs, Shreveport, LA (US); Christopher Armand, Shreveport, LA (US)

(73) Assignee: Swaybox Studios, Inc., Shreveport, LA (US)

( * ) Notice: Subject to any disclaimer, the term of this patent is extended or adjusted under 35 U.S.C. 154(b) by 0 days.

(21) Appl. No.: 15/614,645

(22) Filed: Jun. 6, 2017

(51) Int. Cl.
  *H04N 5/78* (2006.01)
  *H04N 5/7826* (2006.01)
  *G11B 27/10* (2006.01)
  *H04N 9/877* (2006.01)

(52) U.S. Cl.
  CPC ....... *H04N 5/78266* (2013.01); *G11B 27/105* (2013.01); *H04N 9/877* (2013.01)

(58) Field of Classification Search
  None
  See application file for complete search history.

(56) References Cited

U.S. PATENT DOCUMENTS

| | | | | |
|---|---|---|---|---|
| 2002/0191109 A1* | 12/2002 | Kriegman | ............... | G03B 15/10 348/587 |
| 2013/0007636 A1* | 1/2013 | Boss | ................... | G06F 3/011 715/757 |
| 2016/0045834 A1* | 2/2016 | Burns | ................... | A63H 3/52 446/268 |
| 2017/0148267 A1* | 5/2017 | Parker | ................. | G07F 17/3206 |

\* cited by examiner

*Primary Examiner* — Eileen M Adams  
(74) *Attorney, Agent, or Firm* — Bechen, PLLC (57) ABSTRACT

A method of creating a video of a puppet character comprising filming a scene including a first portion of a puppet character on a first recorded track, filming the same scene including a second portion of the puppet character on a second recorded track, and combining the first portion of the puppet character from the first recorded track and the second portion of the puppet character from the second recorded track together onto a single video recording of the scene with an assembled puppet character.

20 Claims, 7 Drawing Sheets

MULTI-TRACK PUPPETRY

BACKGROUND OF THE INVENTION

Computer animation has progressed substantially in the past two decades, but live recordings—including puppetry—still offer much higher resolution and a more realistic visceral feel. Live action recording of puppets has limitations though, especially with multiple puppeteer actuated puppets. Puppetry provides a means for storytelling that has not had the expanse of use in major motion pictures as has live action human or animation because of perceived technical limitations, complexity, and articulation quality issues. There exists a need for providing technical solutions to puppetry limitations to allow the expanded use of puppetry medium in video productions.

SUMMARY OF THE INVENTION

Wherefore, it is an object of the present invention to overcome the above mentioned shortcomings and drawbacks associated with the current technology.

The present invention also relates to filmed performances of puppetry, with puppeteers moving portions of their puppeted character in real time. Multi Track puppetry allows a puppeteer or group of puppeteers to perform different components/portions (body parts or "pieces") of a character/creature separately and at a different time. The computer then puts the various recorded pieces together to create a seamless and unified performance. As just one example, a scene in which a character walks across the street and waves could be performed as a composite of partial scenes as follows: a first puppeteer is recorded performing a scene puppeting only the body and legs of the character; then the same or a second puppeteer is recorded performing the scene puppeting only the left arm of the character; then the same first or second or a third puppeteer is recorded performing the scene puppeting only the right arm of the character; then the same first, second, or third or a fourth puppeteer is recorded performing the scene puppeting only the head of the character. The recordings of the scenes of the various body parts are then compiled via a computer to create one scene with the whole body of the character. This allows for asynchronous recordings of various portions (including of different scales) of a single bodied character to be combined to form an illusion of a single live recorded character.

The present invention is directed to apparatuses and methods of creating a video of a puppet character comprising filming a scene including a first portion of a puppet character on a first recorded track, filming the same scene including a second portion of the puppet character on a second recorded track, and combining the first portion of the puppet character from the first recorded track and the second portion of the puppet character from the second recorded track together onto a single video recording of the scene with an assembled puppet character. According to a further embodiment, multiple single video recordings are combined to create a combined video recording lasting longer than 20 minutes. According to a further embodiment, the filming of the first portion of the puppet character and the second portion of the puppet character are conducted one of in separate time, in separate space, with separate cameras, and some combination thereof. According to a further embodiment, the first portion of the puppet character and the second portion of the puppet character are of different scales. According to a further embodiment, a first puppeteer puppets the first portion of the puppet character and a second puppeteer puppets the second portion of the puppet character. According to a further embodiment, a first puppeteer puppets both the first portion of the puppet character and the second portion of the puppet character. According to a further embodiment, the same scene is filmed including a third portion of the puppet character on a third recording track and the third portion of the puppet character from the third recorded track is combined together with first portion of the puppet character from the first recorded track and the second portion of the puppet character from the second recorded track onto the single video recording of the scene with the assembled puppet character. According to a further embodiment, two of the three portions of the puppet character are of the same scale and one of the three portions of the puppet character is of a different scale. According to a further embodiment, each of the three portions of the puppet character are of different scales. According to a further embodiment, the first portion of the puppet character has a first tracking marker and the second portion of the puppet character has a second tracking marker. According to a further embodiment, the first tracking marker is located adjacent to a location where the second portion of the puppet character will connect with the first portion of the puppet character after the combining step, and the second tracking marker is located adjacent to a location where the first portion of the puppet character will connect with the second portion of the puppet character after the assembling step. According to a further embodiment, the same scene is filmed including a third portion of the puppet character on a third recording track and the third portion of the puppet character from the third recorded track is combined together with first portion of the puppet character from the first recorded track and the second portion of the puppet character from the second recorded track onto the single video recording of the scene with the assembled puppet character, and the portion of the puppet character has a third tracking marker. According to a further embodiment, the third tracking marker is located adjacent to a location where one of the first and the second portions of the puppet character will connect with the third portion of the puppet character after the assembling step. According to a further embodiment, the tracking marker is mounted on an extension that extends away from the first or the second portion of the puppet character. According to a further embodiment, the tracking marker is one of a three dimensional regular polygon, a sphere, and a two dimensional shape, and the tracking marker is substantially monochromatic. According to a further embodiment, the tracking marker one of reflects and emits a non-visual electromagnetic signal that is detected by a detector. According to a further embodiment, the tracking marker detects its own three dimensional location. According to a further embodiment, the tracking marker one of records and transmits its three dimensional location during filming of the scene.

The disclosed invention further relates to methods and puppet character kits comprising a first portion of the puppet character, a second portion of the puppet character disconnected from the first portion, and a tracking marker on one of the first portion of the puppet character and the second portion of the puppet character adjacent to a connection location between the first portion and the second portion. According to a further embodiment, the first portion of the puppet character is of a different scale than the second portion of the puppet character. The recording tracks maybe analog or digital and may be made on exposure film, flash memory, hard drive, for example, including other electronic manners of capturing video.

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm. The embodiments set forth the below represent the necessary information to enable those skilled in the art to practice the invention and illustrate the best mode of practicing the invention. In addition, the invention does not require that all the advantageous features and all the advantages need to be incorporated into every embodiment of the invention.

Figure 1:
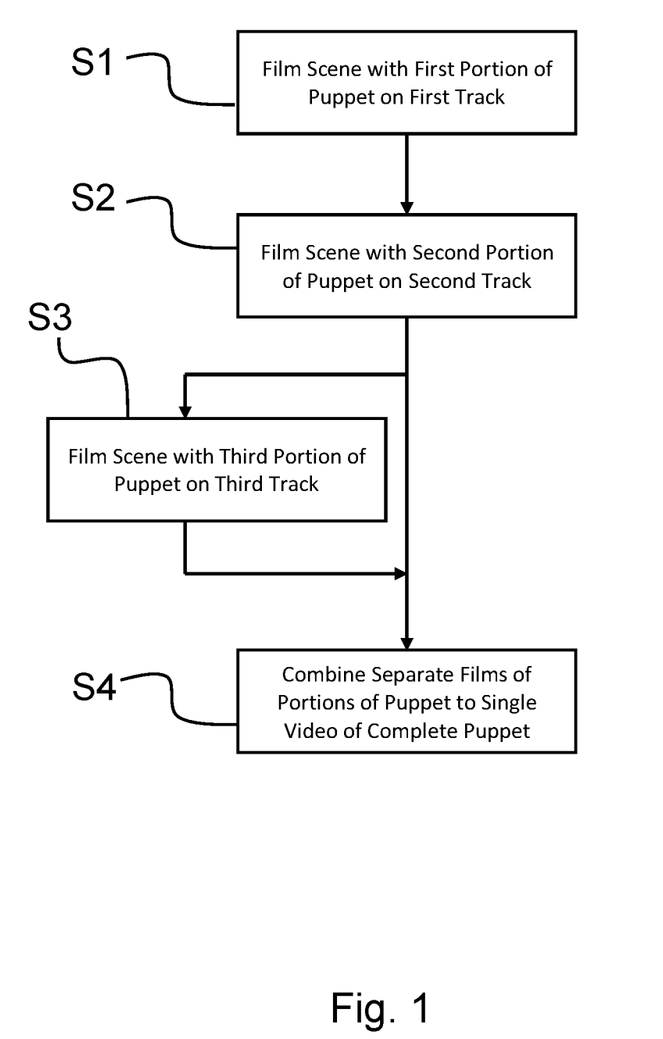
FIG. 1 a flowchart of a first embodiment of the disclosed method.

Turning now to FIG. 1, a brief description concerning the various components of the present invention will now be briefly discussed. The present invention is related to methods and devices for creating a video 2 of a puppet character 4 comprising a first step S1 of filming a scene 6 of at least a first portion 8 of the puppet character 4 on a first video recording track 10, a second step S2 of filming the same scene 6 including a second portion 12 of the puppet character 4 on a second video recording track 14, preferably a third step S3 of filming the same scene 6 with a third portion 16 of the puppet character 4 on a third video recording track 16, and a fourth step S4 of combining the first video recording track 10 of the first portion 8 of the puppet character 4, the second video recording track 14 of the second portion 12 of the puppet character 4, and preferably the third video recording track 18 of the third portion 16 of the puppet character 4 together onto a single video recording 2 of the scene 6 with an assembled puppet character 4. The video 2 produced can be a single scene 6 or a compilation of multiple sequential scenes 6 lasting one or more seconds long, one or more minutes long, or one or more hours long, as desired, including feature length movies.

Figure 2:
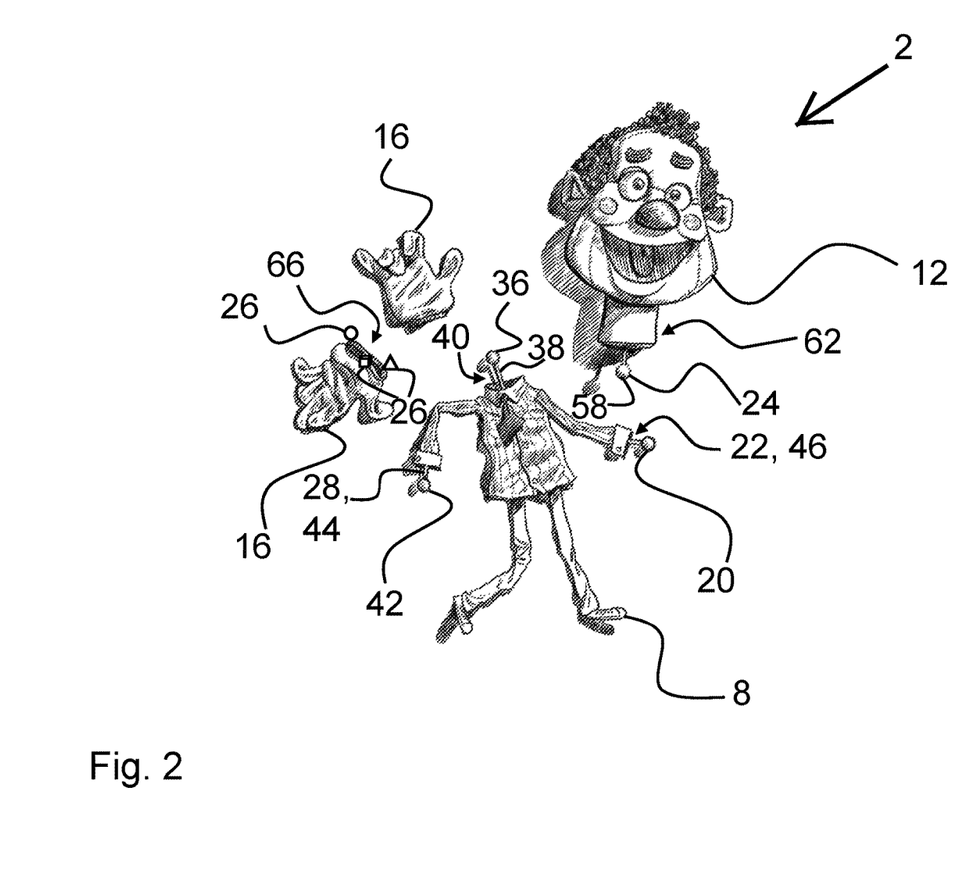
FIG. 2 is a top plan view of a puppet character divided into multiple parts or portions.

Turning to FIG. 2, as can be seen in this embodiment, the puppet character 4 has been split into multiple portions 8, 12, 16. In this embodiment, the first portion 8 of the puppet character 4 is the headless and handless torso, arms, legs and feet. The second portion 12 of the puppet character 4 is the head. The third portion 16 of the puppet character 4 is the two hands. It is to be noted that the third portion is optional, and that further fourth, fifth, sixths, seventh, and further portions and associated filming steps may also be provided.

In this embodiment, the three portions 8, 12, 16 are of different scales. The first portion 8 is about 1:4 scale, or about one fourth the scale of the size the puppet character 4 is depicted as being in the final video 2. The second portion 12 is about 2:1 scale. The third portion 16 is about 3:2 scale. In an alternative embodiment, the different portions 8, 12, 16 of the puppet character 4 may all be of the same scale. In a further alternative embodiment, two, three, four or more of the portions 8, 12, 16 may be of the same scale while one, two, three, four, or more other portion(s) 8, 12, 16 may be of different scale(s).

Each portion 8, 12, 16 preferably has a tracking marker 20 adjacent to a connection location 22. The connection locations 22 are a physical location on a given portion 8, 12, 16 where an other portion 8, 12, 16 would connect to the given portion 8, 12, 16 when the puppet character 4 is assembled. The tracking markers 20 may be three dimensional shapes, such as spheres (as shown), cubes, or pyramids, for example. They may also be two dimensional shapes like circles, regular polygons, crosses or unique shapes. Though each portion 8, 12, 16 preferably has a tracking marker 20 adjacent to a connection location 22, the invention may also function with a tracking marker 20 on only one connection location for two complementary connection location 22 or mating portions of puppet characters—such as a hand and a wrist or a head and neck for example.

The tracking markers 20 may be mounted tracking markers 24 as shown or surface tracking markers 26, for example. Mounted tracking markers 24 may be two or three dimensional, and are mounted on extensions 28 that preferably extend away from the puppet portion 8, 12, 16. The extensions 28 may be rods or dowels that are preferably mounted internally in the puppet portion 8, 12, 16 and preferably extend through a central area of the connection location 22. Alternatively or additionally, surface tracking markers 26 may be used, which may be applied on the surface of the puppet character portion 8, 12, 16, especially those portions 8, 12, 16 like the gloves in FIG. 4, that are meant to be worn when puppeted. The surface tracking markers 26 may be two dimensional or three dimensional, and are preferably applied in the proximity or directly adjacent to the connection location 22. Multiple surface tracking markers 26 may be used around a perimeter of the connection location 22 to aid in tracking. Additionally, different shaped, sized, or colored tracking markers 20 may be used for different puppet portions 8, 12, 16, or different connection locations 22 on a same puppet portion 8, 12, 16. Additionally, different shaped, sized, or colored tracking markers 20 may be used around a perimeter of a same connection location 22, to aid in three dimensionally orienting the puppet portion 8, 12, 16 during filming.

The various portions of the puppet character's body parts are puppeted, preferably having appropriate tracking markers. The tracking marker is any marker the computer can easily identify for the purpose of marking the connection point of the various components. Examples of tracking markers include small colored sticker, ping pall ball painted certain color, colored plastic pyramids and a wooden stick with a colored dot on it. Some examples of the color are green and hot pink, though other colors could be used, including markers painted with non-visible light wave reflective coverings, such as UV reflective, infrared reflective, microwave reflective, and radio wave reflective coverings. The shape and or the color of the tracking marker should stand out in most or all lighting and be a color and or shape that is easily trackable.

Figure 3:
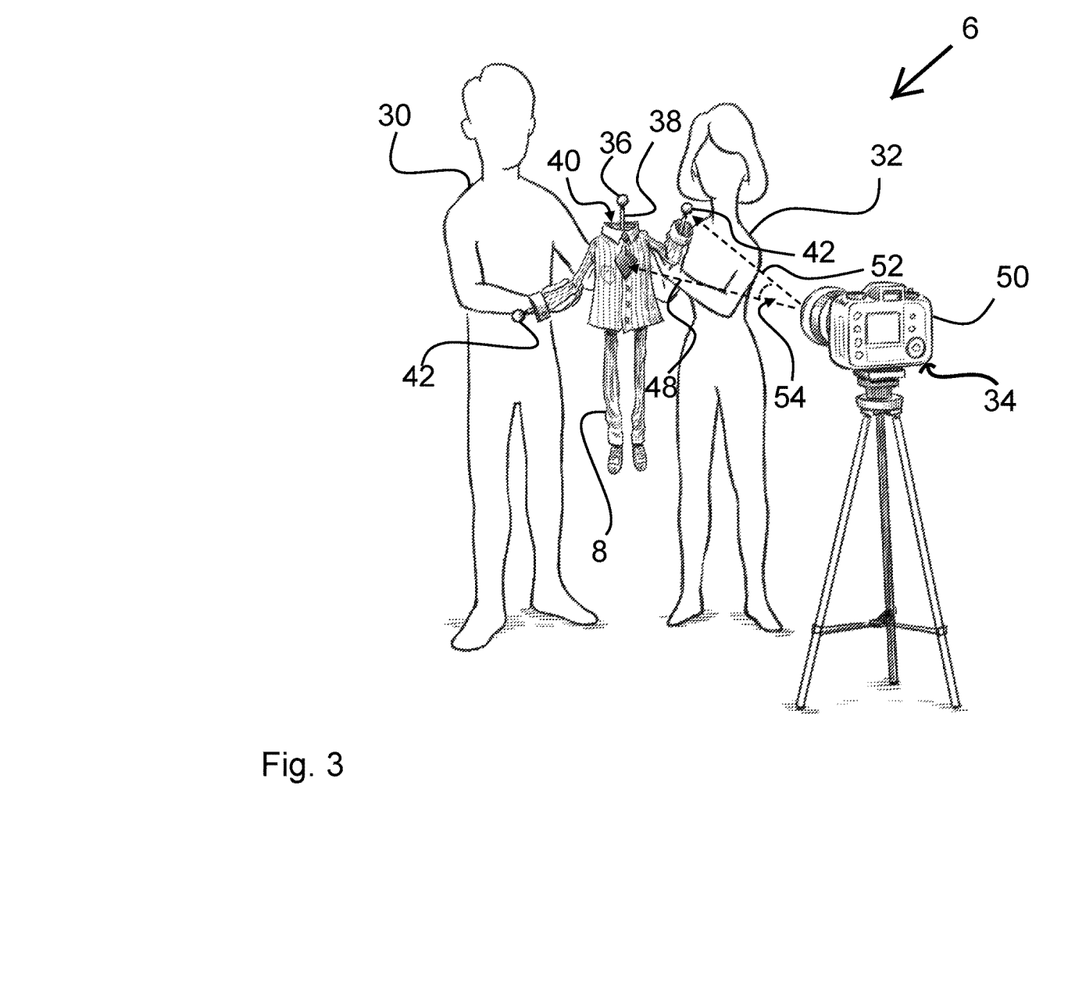
FIG. 3 is a perspective view of a first and a second puppeteer recording a scene with a first portion of the puppet character of FIG. 2.

Turning to FIG. 3-7, an exemplary embodiment of the disclosed multi-track puppeting device and method is shown. In FIG. 3, a first filming step S1 is shown. In this step first and a second puppeteer 30, 32 are shown filming a scene 6 with the first portion 8 of the puppet character 4 on a first recording track 34. This first portion 8 is the torso, arms, legs and feet of the puppet character 4. A first tracking marker 36 is mounted on a first tracking marker extension 38, which is connected to the interior of the first portion 8 of the puppet character 4 and extends through a central area of a primary first connection location 40. The primary first connection location 40 is where the first portion 8 of the puppet character 4 connects to the second portion 12 of the puppet character 4 when the puppet character 4 is assembled in the final video 2. The primary first connection location 40 in the embodiment shown is proximate to where the neck of the puppet character 4 would be. Second tracking markers 42 are mounted on second tracking marker extensions 44, which are connected to the interior of the puppet character 4 and extend through a central area of secondary first connection locations 46. The two secondary first connection locations 46 shown are where the first portion 8 of the puppet character 4 connects to the two third portions 16 of the puppet character 4. The secondary first connection locations 46 in the embodiment shown is proximate to the wrists of the puppet character 4, or where the forearms would connect to the hands. In the embodiment shown, the first portion 8 has three connection locations 22, one primary first connection location 40 and two secondary first connection locations 46, with each connection location 40, 46 having a mounted tracking marker 24. In other embodiments, some or all of the connection locations 22 could have surface tracking markers 26, or no tracking markers.

The scene is preferably filmed in front of a chroma key green screen and the first and the second puppeteers 30, 32 are preferably dressed in a green screen suit or other clothing to allow the background and the two puppeteers 30, 32 to be easily removed or edited out the final video in the combining step. It is understood that various colored or types of chroma key type backgrounds and suit may be used as is appropriate. Additionally or alternatively, the scene 6 may be filmed in front of a background to be used in the video, or for example, a filmed background may be combined in the combining step S4.

As shown, the puppeteers 30, 32, while filming the scene 6, preferably remain cognizant of the first portion 8 of the puppet character's 4 location with respect to a central recording axis 48 of the filming camera 50, and of the locations of the primary and secondary first connection locations 40, 46 with respect to the central recording axis 48. The central recording axis 48 is an imaginary line formed by a straight ahead axial view from a center of the lens for the filming camera 50. Also shown is a connection location vector 52 formed by an imaginary line extending from a connection location 22 to the center of the lens for the filming camera 50. The connection location vector 52 shown in FIG. 3 is for the secondary first connection location 46 proximate to the left wrist of the puppet character 4. A connection angle 54 is formed by the angle between the central recording axis 48 and the connection location vector 52, preferably including both the magnitude and direction of the angle from the central recording axis 48. By substantially maintaining a same connection angle 54 for complimentary connection locations 22 between respective filmings S1, S2, S3 of a same scene 6 with different portions 8, 12, 16 of the puppet character 4, visual perspective agreement is maintained for the different portions 8, 12, 16 of the puppet character about the connection locations 22 when the final video 2 is combined, enchaining the realism of the assembled puppet character 6 in the video 2.

Figure 4:
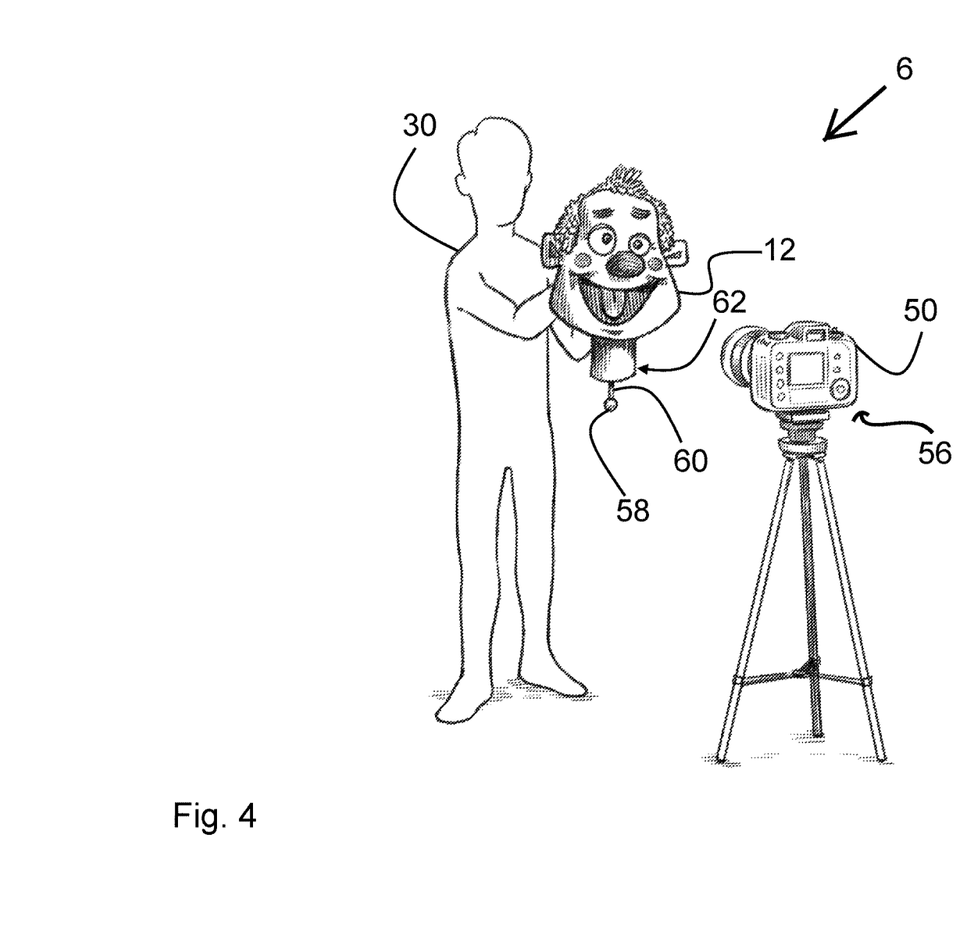
FIG. 4 is a perspective view of the first puppeteer from FIG. 3 recording the same scene of FIG. 3, but with a second portion of the puppet character of FIG. 2.

Turning to FIG. 4, a second filming step S2 is shown. In this step the first puppeteer 30 is shown filming the same scene 6 as in FIG. 3, but with the second portion 12 of the puppet character 4 on a second recording track 56. The second portion 12 in the embodiment shown is the head and neck of the puppet character 4. A third tracking marker 58 is mounted on a third tracking marker extension 60, which is connected to the interior of the second portion 12 of the puppet character 4 and extends from a central area of a second connection location 62. The primary first connection location 40 is where the first portion 8 of the puppet character 4 connects to the second portion 12 of the puppet character 4. The second connection location 62 in the embodiment shown is proximate to the neck of the puppet character 4.

Figure 5:
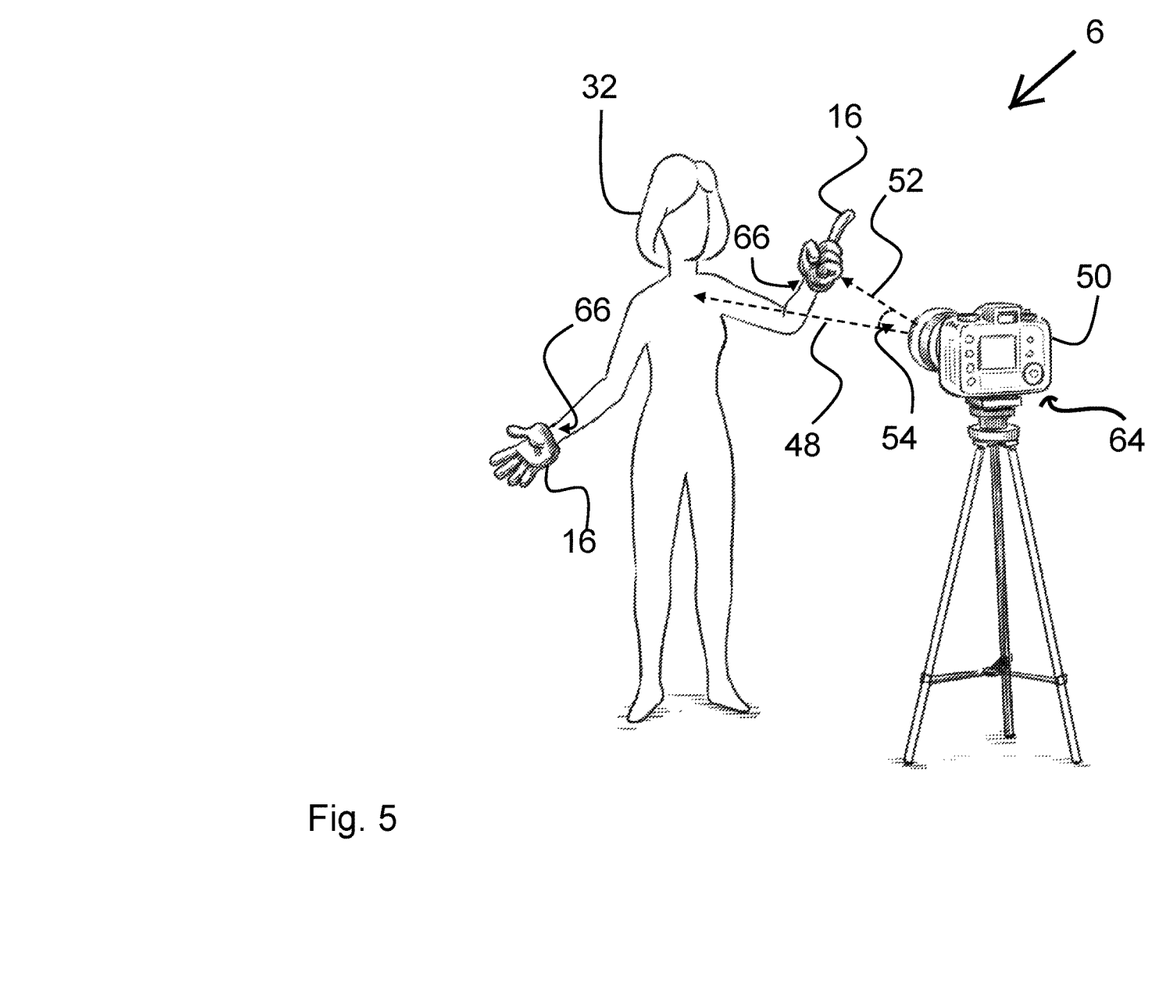
FIG. 5 is a perspective view of the second puppeteer from FIG. 3 recording the same scene of FIG. 3, but with a third portion of the puppet character of FIG. 2.

Turning to FIG. 5, a third filming step S3 is shown. In this step the second puppeteer 32 is shown filming the same scene 6 as in FIGS. 3 and 4, but in this step the filming is with the third portion 16 of the puppet character 4 on a third recording track 64. The third portion 16 in the embodiment shown is the right and the left hands of the puppet character 4. In this embodiment, no tracking marker 20 is mounted on either of the third portions 16, including at third connection locations 66. The third connection location 66 is where the first portion 8 of the puppet character 4 connects to the third portion 16 of the puppet character 4. The third connection location 66 in the embodiment shown is proximate to the wrists of the puppet character 4.

Figure 6:
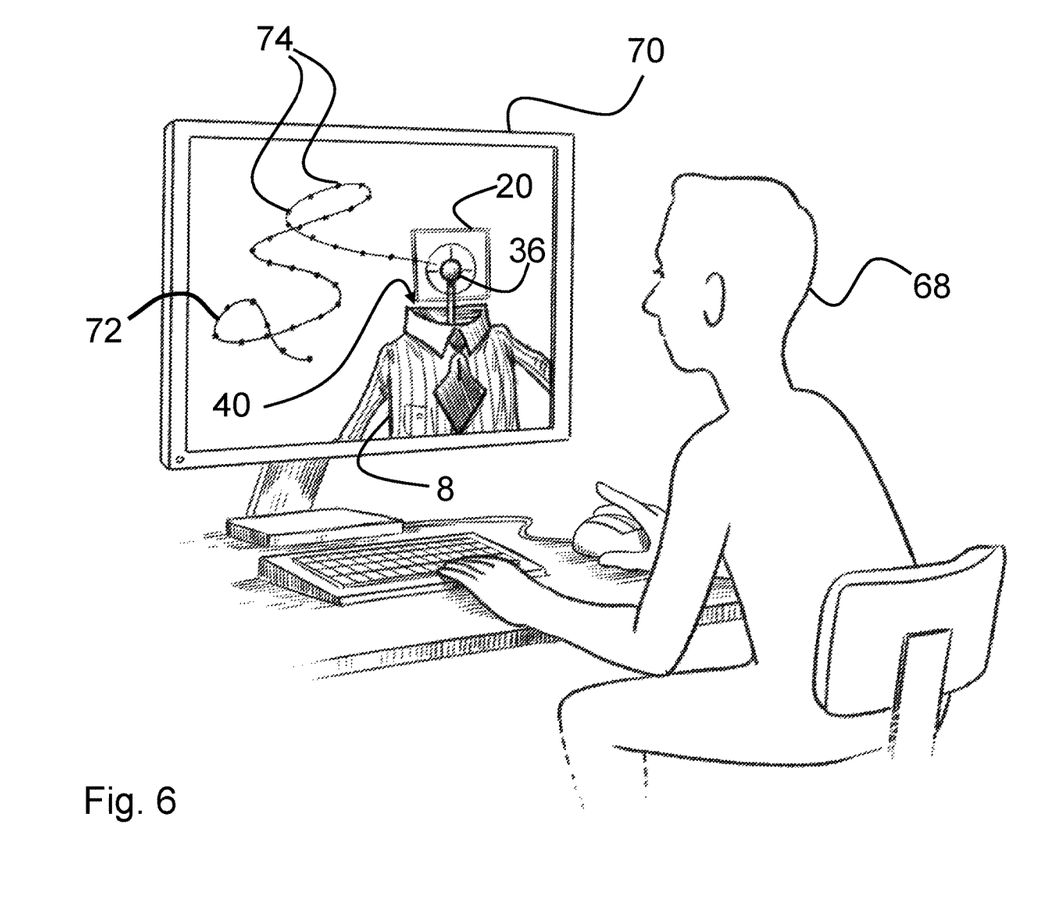
FIG. 6 is a perspective view of an animator combining the recordings from FIGS. 3-5.
Figure 7:
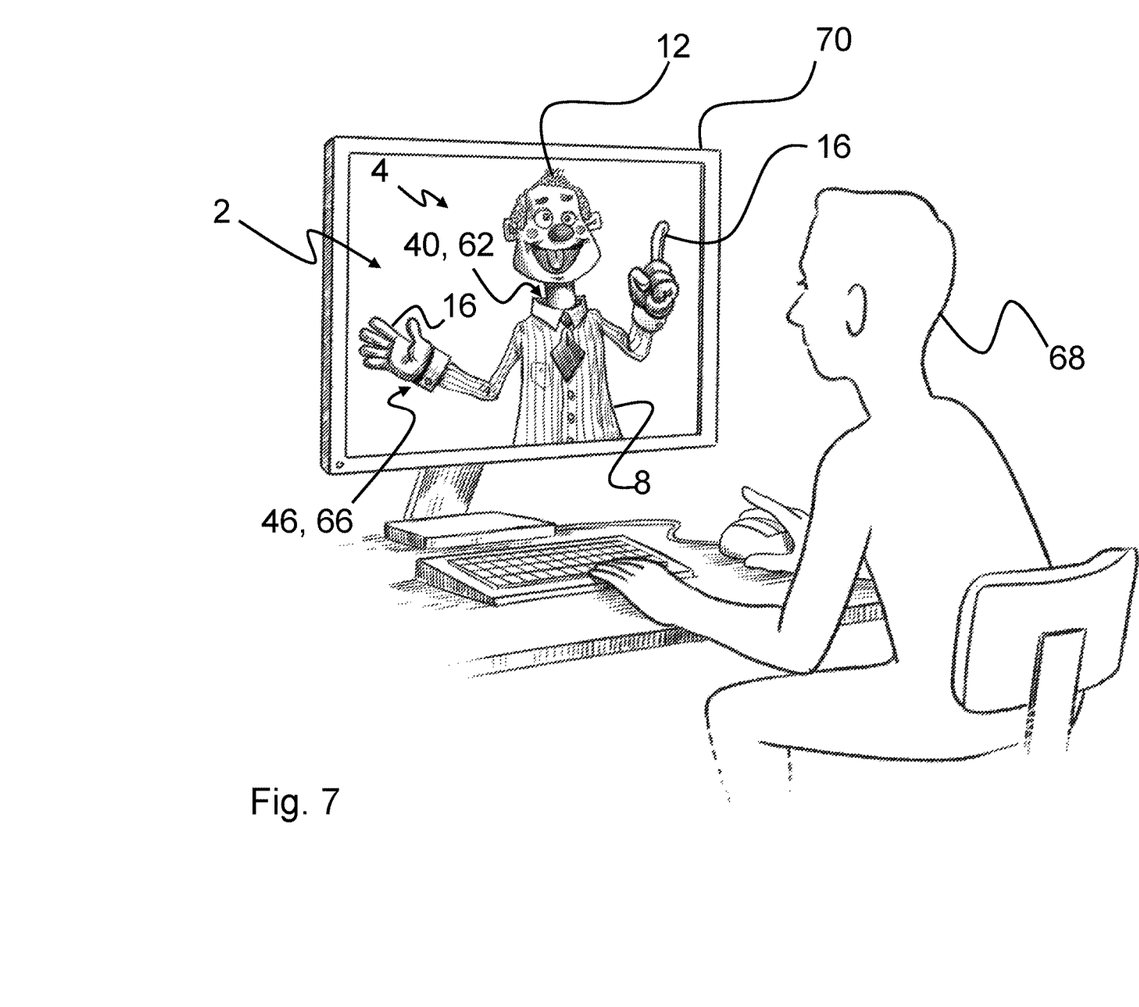
FIG. 7 is a combined video of the recordings from FIGS. 3-5.

Turning to FIG. 6, a fourth combining step S4, and in FIG. 7, the resulting completed puppet character video, is shown. In the fourth combining step S4 an artist 68 or operator combines the first video recording track 10 of the first portion 8 of the puppet character 4, the second video recording track 14 of the second portion 12 of the puppet character 4, and the third video recording track 18 of the third portion 16 of the puppet character 4 together onto a single video recording 2 of the scene 6 with an assembled puppet character 4 (shown in FIG. 7). Using the tracking information captured in the various video recording tracks 10, 14, 18 and a personal computer 70, for example, running visual effects software, the artist attaches the different portions 8, 12, 16 of the puppet characters 4 body parts back together. Some examples of visual effects software with a tracking tool include Astra Effects™, PS Track™, and NUKE™.

In this step S4, in each video recording track 10, 14, 18 the background and puppeteers 30, 32 are extracted or cropped out of the video recording tracks 10, 14, 18 to leave the respective portions 8, 12 16 on the respective video recording tracks 10, 14, 18. The computer 70 then creates a 4D track 72 with frame nodes 74 that correspond to the location of a given tracking marker 20 on each frame of video for a given time period. The thirty-one frame nodes shown in FIG. 6 could represent just over one second of filming, for a 24 frame per second rate of filming. The movement of the portions 8, 12, 16, frame by frame, when properly aligned, gives the impression of smooth and natural movement in the finished video 2. The artist 68 confirms that the 4D track 72 created by the computer 70 is correct, and the artist 68 can edit the location of the frame nodes 74 to align with the true locations tracking markers 20 on each frame. This is referred to as getting a track of the object. The preferable manner is recording a portion 8, 12, 16 that has a tracking marker 20, where the tracking marker 20 is visible all the time. This allow the computer 70 to easily recognize the tracking marker 20 and create the 4D track 72 and the artist 68 to easily confirm the 4D track 72. A more laborious alternative is to manually track a filmed scene of a portion 8, 12, 16. With manual tracking the artist 68 moves preferably frame by frame to manual track the portion 8, 12, 16, "eyeballing" where a tracking marker would be, and assigning a frame node 74 for each frame for the portion, and thereby creating—frame by frame—a 4D track 72.

The tracking marker 20 may have additional shape or size features that help the artist (or computer 70) plot or confirm the 4D track 72 of the portion 8, 12, 16. As shown in the embodiment of FIG. 6, a square frame and inscribed circle and cross may also be mounted on the tracking marker 20. This would give the artist more visual information, more means of checking if the 4D track 72 is accurate. This is another reason that preferably the tracking marker 20 is a color that stands out and is visible in darkness and light.

Then separate portions 8, 12, 16 are layer or joined together to create a whole puppet character 4 at complementary connection locations 22 by aligning the tracking markers 20 for each portion to the tracking nodes 74 on respective 4D tracks 72. A complementary connection location 22 is where two connection locations 22 join, such as the primary first connection location 40 and the second connection location 62 in the embodiment shown. There is preferably a single 4D track for each complementary connection location 22. Alternatively, separate 4D tracks may be created for each tracking marker 20, and then the artist can separately match the frame nodes 74 for the 4D tracks 72 for complementary connection locations 22. Additionally, the computer can automatically match the frame nodes 74 for the 4D tracks 72 for complementary connection locations, and the artist 68 can preferably confirm the computer's 70 matching, and edit as needed.

When a tracking marker 20 physically extends beyond the connection location 20, a connection gap may be factored into the combination step S4, whereby a frame node 74 aligning with a tracking marker will align with a frame node 74 for a complementary tracking marker 20, but will offset the second frame node 74 by a set amount in a set direction—for example the scaled distance the first tracking marker 36 extends beyond the primary first connection location 40 plus the scaled distance the third tracking marker 58 extends beyond second connection location 62, with such gap amount and direction being adjusted by the angle of the two portions 8, 12, 16 to one another.

As stated above, a tracking marker 20 is not necessary for all of the separate portions 8, 12, 16, but greatly expedites the combination step S4 if present. Preferably, at least one of two connecting portions 8, 12, 16 will have a tracking marker 20. Items like gloves, which are worn by puppeteers 30, 32, may not have tracking markers 20. In such circumstances, as described above, the artist 68 will preferably composite the portion 8, 12, 16 manually, that is, for example, will "eyeball" a center of the wrist for the glove when attaching the glove to a frame node 74 or to the wrist of the torso portion 8.

Preferably, a tracking marker 20 on is on the negative not the positive. In one embodiment, the tracking marker 20 is only put on the asset or portion 8, 12, 16 the body is being attached to. So if two body parts are being connected, one tracking marker 20 could suffice. A tracking marker 20 for each is preferable though.

As mentioned briefly above, other types of tracking markers 20 may include different type of laser or ultraviolet tracking markers 20, which are preferably visible through a puppeteer's 30, 32 skin or body, such that the camera 50 computer can "see" the tracking marker 20 no matter where the puppeteer's hand or arm is, even if the puppeteer's 30, 32 hand or arm is between the tracking marker 20 and the camera 50. In such embodiments, the tracking marker 20 may be used inside the glove or other worn portions 8, 12, 16. This will allow the camera to track the portion 8, 12, 16 so that the camera can pick up the tracking marker 20 no matter where puppeteer's 30, 32 hand is.

In further embodiments, the tracking marker 20 may reflect or emit a preferably non-visual electromagnetic signal to a detector(s), either through the camera lens, mounted on the camera, or mounted elsewhere in filming area. In one embodiment there can be three or four detectors spaced in the in or near the filming area to triangulate the location of each non-visual electromagnetic signal emitting/reflecting tracking marker 20. In this way, the separate tracking markers 20 may be tracked in three dimensions over time without impeding visually on the take. The tracking data from the separate tracking markers 20 could be compiled in the computer 70 to compute a 4D track 72 for the separate tracking markers 20.

In still further embodiments, the separate tracking markers 20 could contain preferably miniaturized microprocessors, memory, and sensors, including accelerometers and/or 3 dimensional location sensors, for example. In this embodiment, each tracking marker 20 could track and record in memory its own movement through three dimensional space and time. After the puppeteers 30, 32 record the scene 6, and the tracking marker 20 records in memory its location data, the tracking marker's 20 data could be uploaded to the computer 70 and the 4D track 72 for the separate tracking markers 20 could be computed. Additionally or alternatively to having onboard memory, the tracking markers 20 of this embodiment could have wireless transmitting functionality, such as wi-fi or blue-tooth, just for example, and as the scene 6 is being filmed, these tracking markers 20 could just transmit their respective three dimensional locations in real time to sensors or receivers of the camera 50 or additional sensors or receivers, as the scene 6 was progressing. The data would then be loaded into the computer 70 and 4D tracks 72 for the separate tracking markers 20 could be computed, and the portions 8, 12, 16 of the puppet character 4 then combined for final video 2.

The portions 8, 12, 16 may be separately adjusted in size in the computer, with magnifications greater than or less than 1.0, to attain a uniform scale for the whole puppet character 4. This is shown in FIG. 7, where the second portion 12 head of the puppet character 4, though multiple times larger than the first portion 8 torso of the puppet character 4, is resized to be an appropriate size for the first portion 8 torso.

In embodiments when the background is filmed with the portion 8, 12, 16, the puppeteers will be cropped or chroma keyed out and the respective portion and background remain 8, 12, 16, ADVANTAGES: The previously described embodiments and variations of the present invention have many advantages. Some of the advantages of some embodiments include the ability to create a single unitary scaled puppet character of multiple varied scaled portions. This is advantageous if, for example, the puppet character is built to be a 1:6 scale and interact on a 1:6 scale background set, but it is desired to file the puppet character's hands moving and articulating as naturally as someone moving a hand inside of gloves. By separately filming the gloved puppet hands worn and puppeted by a puppeteer, such as in FIG. 5, and then adjusting the scale and adding them to the body, the overall puppet is allowed to be quite small, while still allowing a much higher quality puppeteering of the hands than would be possible otherwise. With the multiple scales of different portions of the puppet character, it is possible to create characters with any proportion and not limited to human armature or anatomy. As stated above, character with apparently tiny hands are possible with hands that are still articulated internally by puppeteers. This allows using and filming an optimal performance size for a given portion of the puppet character, and then rescaling the portion for the combining step and creating the video with a puppet character of unitary scale.

Additionally, by breaking the puppet character into multiple portions, very complex sequences, like a puppet character jumping of a ledge, rolling on the ground, and bouncing up to a walk, for example, become significantly easier by both allowing puppeteers to focus on only a single portion at a time and not requiring that all elements of the puppet character be correct in a single shot. Instead, the hands can be filmed until the hands puppeteer gets the shot correctly puppeted, with the hand puppeteer focusing just on the hands. Then the head can be filmed until the head puppeteer gets the shot correctly puppeted, with the head puppeteer focusing just on the head. As opposed to having 4 to 5 puppeteers manipulating a puppet character for each take, and needing to select a take which is perfect all around. This greatly enhances the separate puppeteers' ability to control the nuance of a performance, and selecting the best take of each portion of the puppet character.

Also, by splitting the puppeting into multiple separately filmed portions, it allows for a reduced number of very talented puppeteers to puppet the entire puppet character. This can be especially advantageous where there are limited numbers of highly talented puppeteers.

Compared with animation, the disclosed invention offers clear advantages in video quality and time requirements. Puppetry is live filmed video that allows high definition and high texture and granularity in appearance. Even though puppetry is a moving inanimate object, the live action film recording offers a visual realism that surpasses animation. Further, even with the embodiments of the disclosed invention using 4D track and combining multiple portions of a puppet character on multiple video recording tracks into a final whole puppet character on a single video, the process can offer significant time advantages over animation, including up to 40 times faster production. The rendering time required to make animated figure approach real life is substantial. With the filmed puppet character though, the texture, lighting, and shadow is instantaneous as soon as the scene is recorded on the camera.

Though various advantages and advantageous features have been described, the present invention does not require all of the advantageous features or all of the advantages to be included into every embodiment.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

We claim:

1. A method of creating a video of a puppet character comprising
    filming a scene including a first portion of a puppet character on a first recorded track, the first portion of the puppet character including a first tracking marker;
    filming the same scene including a second portion of the puppet character on a second recorded track the second portion of the puppet character including a second tracking marker; and
    electronically combining, using a processing device, the first portion of the puppet character from the first recorded track and the second portion of the puppet character from the second recorded track together onto a single video recording of the scene with an assembled puppet character, wherein the first tracking marker is located adjacent to a location where the second portion of the puppet character will connect with the first portion of the puppet character after the assembling step, and the second tracking marker is located adjacent to a location where the first portion of the puppet character will connect with the second portion of the puppet character after the combining step.

2. The method of claim 1 further comprising:
    electronically combining, using the processing device, multiple single video recordings to create a combined video recording.

3. The method of claim 1, wherein the first portion of the puppet character and the second portion of the puppet character are of different scales.

4. The method of claim 1, wherein the first tracking marker is mounted on an extension that extends away from the first portion of the puppet character.

5. A method of creating a video of a puppet character comprising
    filming a scene including a first portion of a puppet character on a first recorded track, the first portion of the puppet character including a first tracking marker;
    filming the same scene including a second portion of the puppet character on a second recorded track the second portion of the puppet character including a second tracking marker;
    electronically combining, using a processing device, the first portion of the puppet character from the first recorded track and the second portion of the puppet character from the second recorded track together onto a single video recording of the scene with an assembled puppet character; and
    filming the same scene including a third portion of the puppet character on a third recording track and combining the third portion of the puppet character from the third recorded track together with first portion of the puppet character from the first recorded track and the second portion of the puppet character from the second recorded track onto the single video recording of the scene with the assembled puppet character, wherein the portion of the puppet character has a third tracking marker.

6. The method of claim 5, wherein the third tracking marker is located adjacent to a location where one of the first and the second portions of the puppet character will connect with the third portion of the puppet character after the assembling step.

7. The method of claim 5, wherein the first portion of the puppet character and the second portion of the puppet character are of different scales.

8. The method of claim 5, wherein the first tracking marker is mounted on an extension that extends away from the first portion of the puppet character.

9. A method of creating a video of a puppet character comprising
    filming a scene including a first portion of a puppet character on a first recorded track, the first portion of the puppet character including a first tracking marker, wherein the tracking marker is one of: a three dimensional regular polygon, a sphere, and a two dimensional shape, and is substantially monochromatic;
    filming the same scene including a second portion of the puppet character on a second recorded track the second portion of the puppet character including a second tracking marker; and
    electronically combining, using a processing device, the first portion of the puppet character from the first recorded track and the second portion of the puppet character from the second recorded track together onto a single video recording of the scene with an assembled puppet character.

10. The method of claim 9 further comprising:
    electronically combining, using the processing device, multiple single video recordings to create a combined video recording.

11. The method of claim 9, wherein the first portion of the puppet character and the second portion of the puppet character are of different scales.

12. The method of claim 9, wherein the first tracking marker is mounted on an extension that extends away from the first portion of the puppet character.

13. A method of creating a video of a puppet character comprising
    filming a scene including a first portion of a puppet character on a first recorded track, the first portion of the puppet character including a first tracking marker, wherein the tracking marker, at least one of: emits and reflects a non-visual electromagnetic signal that is detected by a detector;
    filming the same scene including a second portion of the puppet character on a second recorded track the second portion of the puppet character including a second tracking marker; and
    electronically combining, using a processing device, the first portion of the puppet character from the first recorded track and the second portion of the puppet character from the second recorded track together onto a single video recording of the scene with an assembled puppet character.

14. The method of claim 13 further comprising:
    electronically combining, using the processing device, multiple single video recordings to create a combined video recording.

15. The method of claim 13, wherein the first portion of the puppet character and the second portion of the puppet character are of different scales.

16. The method of claim 13, wherein the first tracking marker is mounted on an extension that extends away from the first portion of the puppet character.

17. A method of creating a video of a puppet character comprising filming a scene including a first portion of a puppet character on a first recorded track, the first portion of the puppet character including a first tracking marker, wherein the tracking marker detects its own three dimensional location, including at least one of records and transmits its three dimensional location during filming the scene;

filming the same scene including a second portion of the puppet character on a second recorded track the second portion of the puppet character including a second tracking marker; and electronically combining, using a processing device, the first portion of the puppet character from the first recorded track and the second portion of the puppet character from the second recorded track together onto a single video recording of the scene with an assembled puppet character.

18. The method of claim 17 further comprising:

electronically combining, using the processing device, multiple single video recordings to create a combined video recording.

19. The method of claim 17, wherein the first portion of the puppet character and the second portion of the puppet character are of different scales.

20. The method of claim 17, wherein the first tracking marker is mounted on an extension that extends away from the first portion of the puppet character.

* * * * *